Jan. 29, 1957  S. A. STAM  2,779,244
LIGHTWEIGHT CRADLE ROCKET LAUNCHER MOUNT
Filed July 29, 1954  2 Sheets-Sheet 1
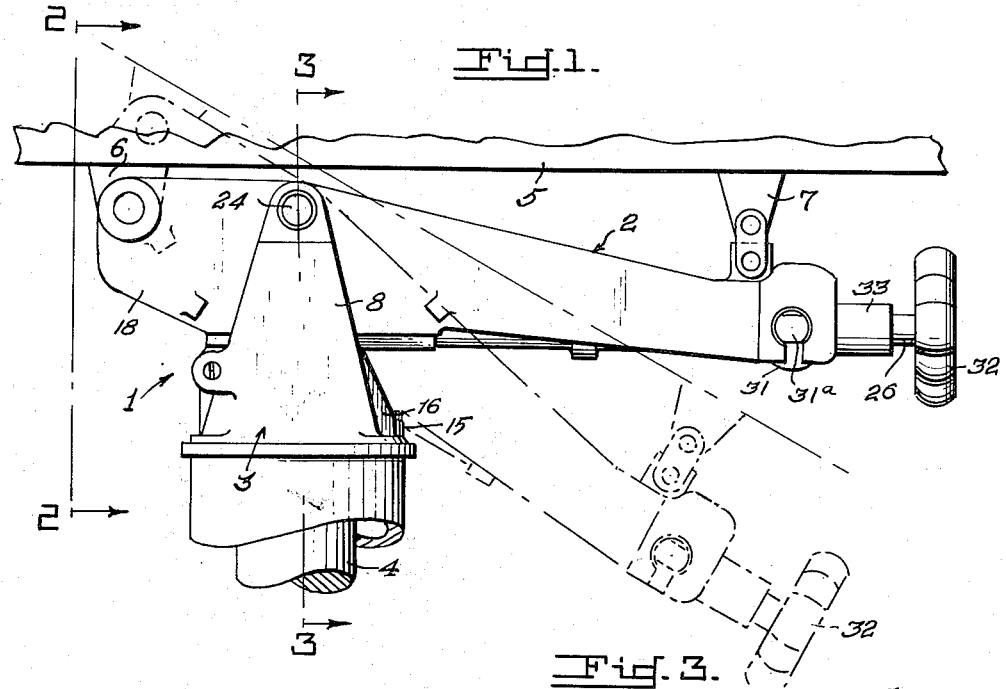
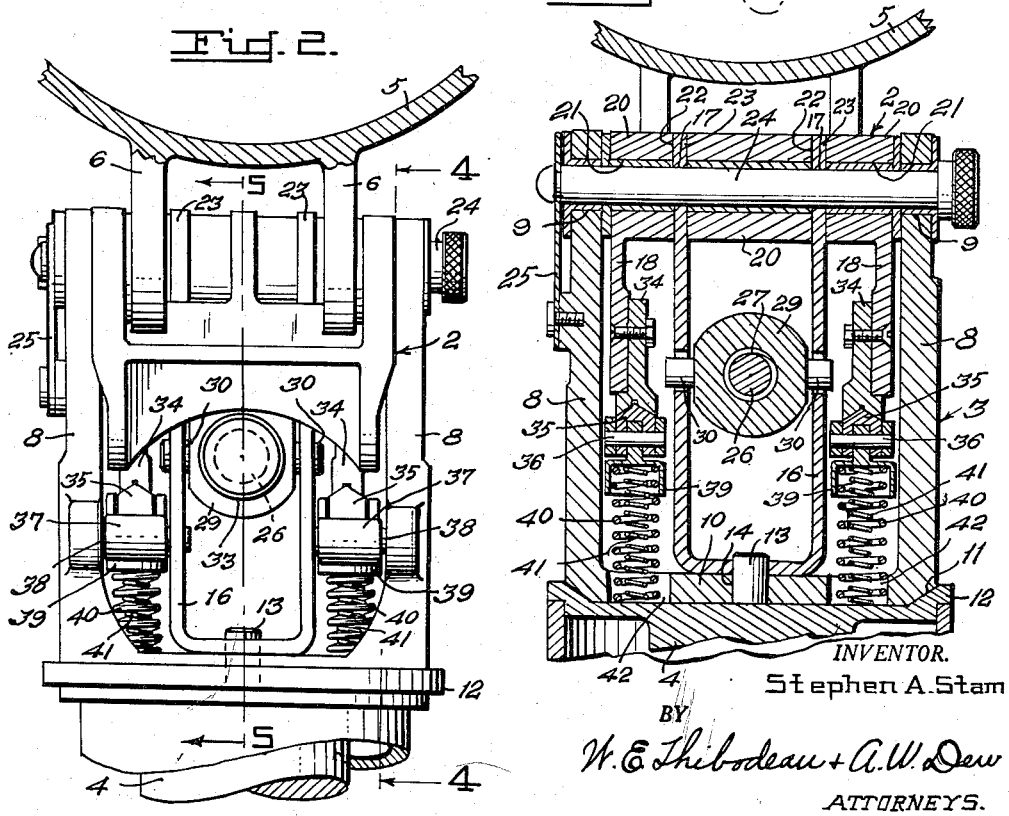
INVENTOR.
Stephen A. Stam
BY
W. E. Thibodeau + A. W. Dew
ATTORNEYS.

Jan. 29, 1957  S. A. STAM  2,779,244
LIGHTWEIGHT CRADLE ROCKET LAUNCHER MOUNT
Filed July 29, 1954  2 Sheets-Sheet 2
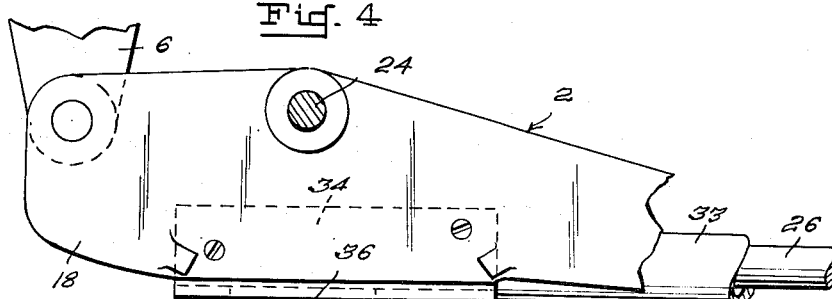
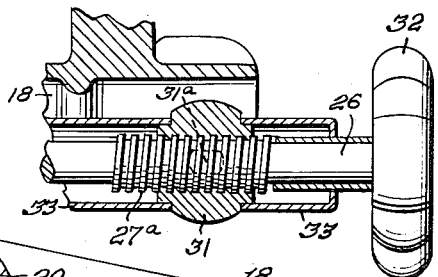
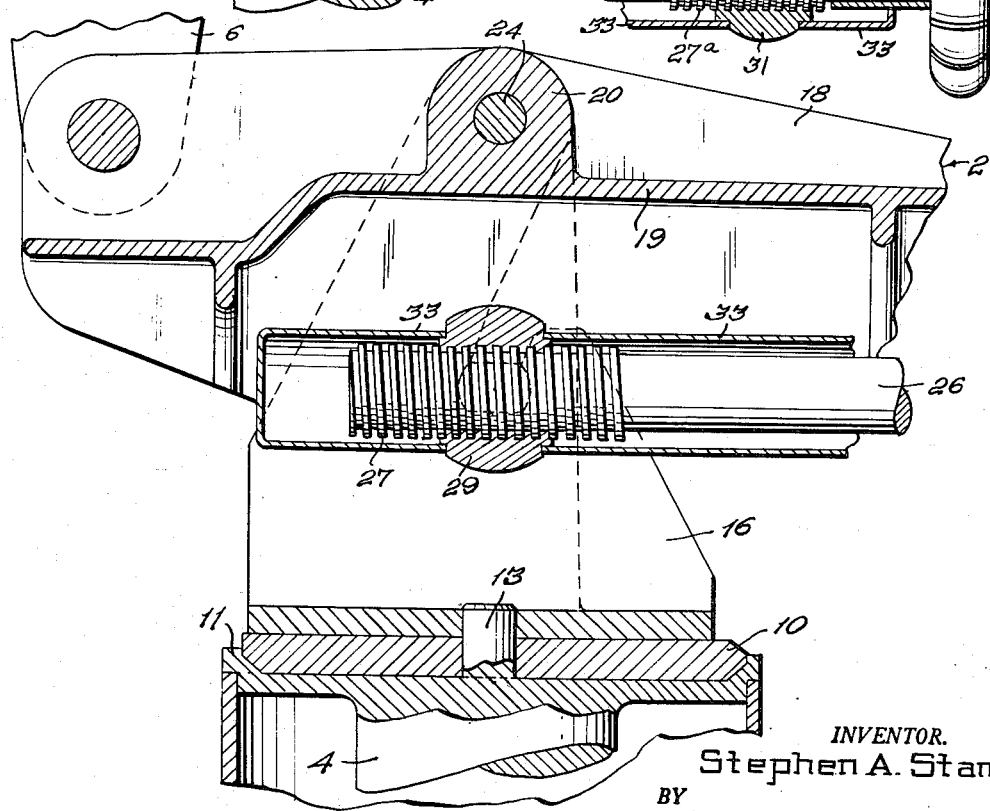
INVENTOR.
Stephen A. Stam
BY
W. E. Thibodeau + A. W. Dew
ATTORNEYS.

United States Patent Office 2,779,244
Patented Jan. 29, 1957

2,779,244

LIGHTWEIGHT CRADLE ROCKET LAUNCHER MOUNT

Stephen A. Stam, Glendale, Calif., assignor to the United States of America as represented by the Secretary of the Army Application July 29, 1954, Serial No. 446,690

11 Claims. (Cl. 89—37)

This invention relates to a lightweight cradle launcher mount and more particularly to an improved cradle and friction brake mechanism of the type employed in the rapid elevating cradle of the M77 tripod mount used with the 3.5 inch rocket launcher.

In mounts of this type, the elevation of the launcher is rapidly effected by the turning of a screw and nut arrangement within the cradle frame which provides a cantilever type of action thereto. A slight turn on the hand wheel of the screw provides rapid elevation to the frame of the cradle upon which the launcher is supported. Braking means for providing sufficient friction between the cradle frame and the yoke is usually a spring biased shoe bearing upon a track carried by the cradle frame. The launcher is so mounted as to turn freely in azimuth merely by swinging it from side to side, as the yoke is attached to a pintle which is received in the pintle socket of the tripod.

This invention proposes to improve the braking mechanism and balance of the cradle by re-design of the braking elements and by raising the pivot point of same and without any change in location of the existing launcher supports. By raising the pivot point and extension of the side webs of the cradle this may be accomplished. This change improves the cantilever action of the elevating mechanism. It is therefore a primary object of this invention to provide a cradle mechanism of greater rigidity yet without complication of the parts.

It is another object of the invention to provide an improved braking means wherein the brake tracks and brake shoes are of straight line or arced contour to substantially compensate for imbalance of any specific launcher at all angles throughout its range of elevation and depression.

It is a still further object to provide a cradle mechanism of somewhat lesser weight and of greater ease of assembly.

The specific nature of the invention as well as other objects and advantages therefor, will clearly appear from a description of a preferred embodiment as shown in the accompanying drawings in which:

Figure 1 is a side elevation of the invention.

Figure 2 is a cross-section taken along line 2—2 of Figure 1 and looking in the direction of the arrows, Figure 3 is a cross-section taken along line 3—3 of Figure 1 and looking in the direction of the arrows, Figure 4 is a longitudinal section taken along line 4—4 of Figure 2, and looking in the direction of the arrows, Figure 5 is an enlarged cross-section taken along line 5—5 of Figure 2 and looking in the direction of the arrows, and Figure 6 is a vertical sectional detail view showing the rearward portion of the elevating shaft and its mounting.

Referring more particularly to the drawing wherein like reference characters designate like or corresponding parts throughout the different views, 1 indicates generally the cradle assembly in its entirety. The assembly comprises a frame member or cradle indicated generally by 2, pivotally mounted to an outer yoke member indicated generally by 3 and a pintle 4 to which the outer yoke 3 is rigidly attached. The pintle 4 is adapted to have a smooth fit within the pintle socket, not shown, of a conventional tripod normally used with this type of mount.

A rocket launcher 5 is secured in the usual manner by fore and after securing members or brackets 6 and 7. The outer yoke 3 is fabricated from a single casting and is substantially U-shaped as shown in Figure 3, and forms a pair of uprights 8 which are transversely bored as at 9 at their upper ends thereof for a purpose to be described hereinafter, integrally united by a base or bight portion 10 received within an annular recess 11 formed in the upper side of a flange 12 forming the upper part of pintle 4. An upright stud 13 is located centrally with said recess 11 integral with pintle 4 and positions the yoke 3 centrally of the recess by passing through a bore 14 in base 10. The yoke is secured to this flange by radially spaced fastening member 15.

An inner yoke member 16 comprising a U-shaped member is provided and rests upon the base 10 between the uprights 8 of the outer yoke 3. This inner yoke is also located by the upright stud 13 and secured by two of the six radially spaced fastening members 15, two of which are shown in Figure 4. The walls of the inner yoke 16 are transversely bored in their upper ends as at 17. These bores are in alignment with bores 9 in the outer yoke 8. This alignment of bores, occupied by a common pivot pin 24, coupled with the location and securing of the inner yoke by the upright stud 13 and the fastening members 15 adds immensely to the rigidity of the cradle.

The frame 2 is cast as a single member and includes a pair of laterally-spaced vertically-disposed side walls 18 joined by a web 19. The web is provided with a thickened portion 20 which is provided with a pair of slots 22 to receive with a smooth fit the upper ends 23 of the inner yoke 16. Portions 20 are transversely bored as at 21, in alignment with bores 9.

A pivot pin 24 passes through bores 9 and 21, thus mounting the frame 2 for smooth pivotal movement between the uprights 8 of yoke 3 about the axis of the pin. A retainer 25 prevents the pin 24 from accidental displacement by engagement in an annular groove formed in its end. (See Figure 3.)

Elevating means for the frame 2 is provided and comprises a cantilever mechanism consisting of a shaft 26, best seen in Figure 5, provided at its forward and rearward ends with motion transmitting threads 27 and 27a of the opposite hand as will be clear from inspection of Figures 5 and 6. The forward threads 27 mesh with an internally threaded nut 29 which is journaled for rotation in the side walls of the inner yoke member 16 by aligned trunnions or pins 30, Figure 3. A rearward nut 31, Figure 6, constructed similarly to the forward nut 29 is mounted by trunnions 31a, between the rearmost part of the side walls 18 of the frame 2, the mounting being similar to the forward mounting. A hand wheel 32 is affixed to the rearward end of the shaft 26 for rotation of same. Suitable grease-retaining caps 33 are provided to confine lubricant and prevent the entrance of dirt and moisture.

The frame width is designed so that its side walls 18 have a smooth fit between the space provided between the uprights 8 of the outer yoke 3 and those of inner yoke member 16. See Figure 3.

Braking means are provided for counteracting the imbalance of frame 2 and launcher 5 about the axis of pin 24. Such means consists of a pair of straight track members 34 rigidly fastened to the inner surfaces of the side walls 18 of the frame 2 and, as best seen in Figures 3 and 4, each has a straight inverted V-shaped brake groove or surface of 60° angularity cut in its lower edge and providing a trackway for a pair of straight edged brake shoes 35 having their upper edges complementally beveled at 60° to fit within the grooves of the track members 34. Each of the shoes 35 is pivotally connected at 36, midway between its ends with a respective one of two arms 37 which are pivoted at their other ends to the inner surface of the side walls 8 of yoke member 3 as at 38. See Figures 2 and 4. A cap 39 is also pivotally mounted on each pivot pin 36 in a manner obvious from inspection of Figure 3. Each cap receives the upper ends of a pair of coaxial upright coil springs 40 and 41. The lower ends of the coil springs are seated in respective recesses 42 formed in the base portion 10 of the outer yoke 3.

In effect the mount defines a triangle with a first relatively short, normally vertical side represented by the distance between the axis of pin 24 and the center of nut 29, and second and third relatively long sides, of which the second is represented by the distance between the axis of pin 24 and the center of nut 31 and is of fixed length, and the third of which is represented by the distance between the centers of nuts 29 and 31 and is of length variable by actuation of handwheel 32. Since the short, normally vertical side is fixed by the mount, adjustment of the length of the third side effects an angular adjustment of the second and third sides about their respective intersections with the first side.

Furthermore, the angular rate for any given change in length of the third side is large and depends upon the ratio of length of the second and/or third sides to the first side. Although the mount disclosed has a range of elevation adjustment from about −15° to +30° or 45° in all, it may be assumed for the purpose of explanation that a 180° range of adjustment is possible, from 90° depression to 90° elevation. For adjustment through such a range, it is clear that the change of length of the third side would be only 2 times the length of the relatively short first side. That is to say, with the mount shown for 90° elevation, the change in length of the third side will be the length of the second side minus the length of the first side and for 90° depression the change will be the length of the second side plus the length of the first side. Thus, only a few rotations of shaft 26 are sufficient to move the mount through the effective range of approximately 45°, and such rotations are further reduced, in fact halved, by the provision of worm portions 27 and 27a of opposite hand.

The mount shown is intended for use more particularly with a magazine type launcher such, for example, as that disclosed in the copending application of Andrew Ballash, Stephen A. Stam and Paul E. Anderson, Serial No. 210,026, filed Feb. 8, 1951 for Repeating Rocket Launcher wherein a magazine is provided to hold several rockets in stacked relation which are successively fed into the launcher tube. Due to the fact that the mass center of the launcher is well above the axis of shaft 24, the imbalance of the assembly increases with the angle of depression and elevation and is, moreover, increased in proportion to the number of rockets in the magazine.

The braking mechanism disclosed is adapted to vary both the frictional and spring resistances with changes in elevation and depression from the zero elevation or point blank position. By making the brake surfaces of tracks 34 substantially straight or in the form of an arc of greater radius than the minimum distance from the surfaces to the axis of pin 24, the position of the brake shoes radially of the axis of pin 24 will vary as a function of the angle of elevation and depression. By various combinations of contours of the tracks 34 about pivot axis of pin 24 and various spring rates I am able to produce frictional resistance which varies with the angles of elevation and depression and hence, with the imbalance of the launcher.

Furthermore, considering that the forces applied by springs 40 and 41 as disclosed always tend to position the cradle and launcher at a point where the spring deflection is a minimum it is apparent that a variety of characteristics may be obtained and that by striking a mean value for the imbalance of the launcher with magazine fully loaded and empty, for each angle of elevation and depression, the imbalance may be kept to a minimum for each angle so that the resistance to turning of shaft 31 is low for all positions of the launcher in elevation and depression. In the embodiment shown, for example, of a straight brake track, the mean friction line passes 2.5″ from the axis of pin 24 and the spring combination has a rate of 72.3 pound/in. Two tracks and two shoes are used, as shown.

It will be noted from Figure 4, that the screws attaching track plates 34 define a line which makes a small angle, about 7½° in the model shown, with the line of the track. With the parts as shown, the compensation is substantially correct for the imbalance of one model of rocket launcher. When, for example, the mount is to be used to support a different model, one for launching rockets of larger caliber for example, and having a greater imbalance in depression that the first model, the track plates are simply reversed and the resulting position of the track inclined upwardly and rearwardly with respect to the position shown, provides an additional resisting moment which effectively compensates for the greater imbalance in depression. The direction and angle of 7½° are, of course, merely by way of example and will be varied in accordance with the average values and direction of imbalance of the second model for various angles of depression and/or elevation. As previously implied, it is also contemplated that the tracks may be arced to a greater or lesser degree as may be required by the corresponding rate of increase of imbalance of any given model with equal increments of change in elevation.

In the claims, the adverb "normally" is to be interpreted as referring to the assembled mount and launcher with the latter in point blank firing positions, that is zero elevation.

It is apparent from the foregoing that an improved cradle elevating and braking mechanism has been devised, simple of construction and highly efficient in operation. A better braking surface has been provided by the improved elements of the braking mechanism and a weight reduction has been achieved by use of fewer parts. These improvements have been achieved without eliminating any of the efficiencies of this type of cradle nor relocation of any of the existing attachments.

While I have shown the preferred form of the invention the invention as now known to me, various modifications and substitutions of equivalents will occur to those skilled in the art after a study of the foregoing disclosure. Hence, the disclosure should be taken in an illustrative rather than a limiting sense, and it is the desire and intention to reserve all modifications within the scope of the subjoined claims.

Having now fully disclosed the invention what is claimed and desired to secure by Letters Patent is:

1. In a mount for a rocket launcher, a yoke having laterally spaced arms, a cradle journaled by and between said arms for pivotal movement about a first normally horizontal axis, a first nut swiveled in said yoke on a second axis vertically offset from and parallel with said first axis, a second nut trunnioned in said cradle, a continuous shaft mounted on a third axis spaced from said first and second axes, said shaft having threaded portions of opposite hands, one of said threaded portions engaging one of said nuts, means for manually turning said shaft, and means for affixing a rocket launcher to said cradle for movement as a unit therewith.

2. A mount as recited in claim 1, a pair of track plates fixed to said cradle in offset relation with said first axis, a pair of track shoes pivoted to said yoke for frictional sliding only along said plates in response to pivoting of said cradle upon rotation of said shaft, and spring means yieldingly urging said shoes into contact with said track plates.

3. A mount as recited in claim 2, said track plates defining substantially straight tracks having their minimum distance from said first axis between the ends of the track.

4. In a mount for a rocket launcher, a yoke having upstanding arms, a cradle journaled by and between said arms for pivotal movement about a first normally horizontal axis, a first nut swiveled in said yoke on a second axis parallel with and spaced a fixed distance from said first axis, a second nut swiveled in said cradle parallel with and longitudinally spaced from said first and second axes, a shaft having threaded portions of opposite hand engaging said nuts respectively, means operable to turn said shaft and correspondingly angularly moves said cradle about said first axis, and means for attaching a rocket launcher to said cradle to be carried thereby.

5. A mount for a rocket launcher comprising, a U-shaped yoke including spaced uprights, a cradle adapted to have a rocket launcher affixed thereon for movement as a unit therewith, means mounting said cradle between said uprights for pivoting about a normally horizontal first axis, a nut swiveled on said yoke on a second axis parallel with and vertically spaced below said first axis, a second nut swiveled in said cradle on a third axis parallel with and horizontally offset from said second axis in the direction of the bore axis of a launcher mounted on said cradle, and a manually operable shaft having first and second threaded portions of opposite hand engaging said first and second nuts, respectively.

6. The mount recited in claim 5, a plate having a straight brake track V-shaped in cross section and affixed to said cradle in offset relation with and perpendicular to said first axis, a brake shoe having a friction surface complementally fitting said track on said plate, an arm pivoted at one end to said yoke and at the other end to said shoe, and spring means urging said shoe into engagement with said track said shoe being adapted to slide on said track when said shaft is rotated to move said cradle about said first axis.

7. In a mount for a rocket launcher, a first U-shaped yoke, a cradle adapted to have a launcher detachably affixed thereon, means pivoting said cradle on and between the uprights of said yoke for movement in elevation about a normally horizontal axis, a plate fixed to said cradle and having a friction track in offset relation with said axis in a plane normal thereto, a brake shoe carried by said yoke for movement toward and from said track only, and a spring urging said shoe into frictional contact with said track.

8. A mount as recited in claim 7, said plate being detachably connected with said yoke at two points defining a line at an acute angle with the direction of said track, whereby said plate may be reversed end-for-end to vary the angular relation of said track with the bore axis of a launcher tube affixed on said cradle.

9. A mount as recited in claim 7, a second U-shaped yoke positioned between the uprights of said first yoke, said pivoting means comprising a pivot pin passing through aligned holes in the upper ends of the uprights of both said yokes, a first nut swiveled by and between the uprights of said second yoke, a second nut swiveled in said cradle, a shaft having threaded portions of opposite hand engaging said nuts respectively, means manually operable to rotate said shaft and means connecting the bight portions of said yokes.

10. In a mount for a rocket launcher, a first U-shaped yoke having spaced normally vertical uprights a second U-shaped yoke having normally vertical uprights spaced a lesser distance than the uprights of said first yoke, means pivotally connecting the bight portions of said yokes with said second yoke inside said first yoke, a cradle adapted to mount a launcher tube and having bearing portions smoothly fitting the spaces between contiguous arms of said yokes, a pivot pin extending through aligned holes in said bearing portions and the upper ends of the uprights of said yokes, a plate having a brake track groove, means fixing said plate to said cradle with its said track in offset relation to said pin and in a plane normal thereto, a shoe having a brake surface complementally fitting the track groove of said plate, an arm pivoted at its respective ends to said first yoke and to said shoe, and spring means urging the brake surface of said shoe into frictional contact with said track.

11. A mount as recited in claim 10, said plate being affixed to said cradle at two points defining a line angularly related to the line of said groove whereby said plate may be reversed end-for-end to change the angular relation of said groove and the bore axis of a launcher fixedly mounted on said cradle.

References Cited in the file of this patent

UNITED STATES PATENTS

| 1,919,223 | Johnston | July 25, 1933 |
| 1,723,623 | Kennedy | Aug. 6, 1939 |
| 2,345,740 | Fogle | Apr. 4, 1944 |
| 2,362,012 | Kendall et al. | Nov. 7, 1944 |
| 2,366,704 | Austin et al. | Jan. 9, 1945 |

FOREIGN PATENTS

| 119,065 | Great Britain | Sept. 26, 1918 |
| 643,299 | Germany | Apr. 3, 1937 |